(12) United States Patent
Baum

(10) Patent No.: US 6,714,630 B1
(45) Date of Patent: Mar. 30, 2004

(54) SYSTEM AND METHOD FOR SCREENING CALLS

(75) Inventor: Alvin W. Baum, North Richland Hills, TX (US)

(73) Assignee: Uniden America Corporation, Fort Worth, TX (US)

(*) Notice: Subject to any disclaimer, the term of this patent is extended or adjusted under 35 U.S.C. 154(b) by 0 days.

(21) Appl. No.: 10/154,270

(22) Filed: May 23, 2002

(51) Int. Cl.[7] ............................. H04M 1/64; H04M 3/42
(52) U.S. Cl. ..................... 379/67.1; 379/70; 379/72; 379/76; 379/77; 379/88.11; 379/88.12; 379/210.02; 379/211.02; 379/212.01; 379/214.01
(58) Field of Search ........................... 379/67.1, 68, 70, 379/71, 72, 76, 77, 79, 81, 82, 88.04, 88.11, 88.12, 88.15, 88.19, 142.07, 201.01, 201.06, 201.07, 201.09, 210.02, 210.03, 211.02, 212.01, 214.01

(56) References Cited

U.S. PATENT DOCUMENTS

| | | | |
|---|---|---|---|
| 4,881,259 A | | 11/1989 | Scordato ..................... 379/58 |
| 4,985,913 A | * | 1/1991 | Shalom et al. ................ 379/76 |
| 5,394,445 A | * | 2/1995 | Ball et al. ..................... 379/67 |
| 5,473,671 A | * | 12/1995 | Partridge, III ................ 379/59 |
| 5,481,596 A | | 1/1996 | Comerford .................... 379/67 |
| 5,483,577 A | * | 1/1996 | Gulick .......................... 379/67 |
| 5,524,140 A | * | 6/1996 | Klausner et al. .............. 379/67 |
| 5,604,791 A | * | 2/1997 | Lee .............................. 379/67 |
| 5,912,948 A | | 6/1999 | Nelson et al. ................ 379/79 |
| 5,953,656 A | | 9/1999 | Bertocci ..................... 455/412 |
| 5,978,451 A | * | 11/1999 | Swan et al. ............. 379/88.24 |
| 6,104,923 A | | 8/2000 | Kite .......................... 455/412 |
| 6,233,330 B1 | * | 5/2001 | McClure et al. ............ 379/212 |
| 2002/0126030 A1 | * | 9/2002 | Perez et al. ................. 341/143 |
| 2002/0154763 A1 | * | 10/2002 | Wang .................... 379/399.01 |

* cited by examiner

*Primary Examiner*—Allan Hoosain
(74) *Attorney, Agent, or Firm*—Christopher J. Rourk; Akin Gump Strauss Hauer & Feld, LLP

(57) ABSTRACT

A system for screening telephone calls is provided. The system includes a ring detector that generates ring status data, such as a first data value when a ring signal is being received and a second data value when no ring signal has been received for a predetermined period of time. A message detector generates message status data, such as a first data value when an outgoing message end tone has been detected and a second data value when no outgoing message end tone has been detected for a predetermined period of time. A message screener is connected to the ring detector and the message detector and amplifies a message based on the ring status data and the message status data, such as when the ring status data and the message data indicate that an incoming message is being recorded.

16 Claims, 5 Drawing Sheets

SYSTEM AND METHOD FOR SCREENING CALLS

FIELD OF THE INVENTION

The present invention is related to call processing, and is more specifically related to the screening of incoming telephone calls.

BACKGROUND OF THE INVENTION

Systems for screening incoming telephone calls are known in the art. These systems generally require that the incoming message be screened by the user after an outgoing message that is sent to the caller is also heard by the user, and also require a separate transmission system for transmitting the incoming message to the user.

These existing systems suffer from significant drawbacks that have resulted in the lack of success of such systems in the marketplace. Consumers generally do not want to listen to the outgoing message before screening a call, as it is tedious and repetitive. Prior art systems that require a wireless system or other such systems for transmitting the outgoing message add significantly to the cost, may be incompatible with existing systems, and contribute to the almost absolute failure of any such prior art systems to be successfully marketed.

SUMMARY OF THE INVENTION

In accordance with the present invention, a system and method for screening calls are provided that overcome known problems with call screening systems and methods.

In particular, a system and method for screening calls are provided that detect a message before initiating screening and that do not require retransmission of the screened message.

In accordance with an exemplary embodiment of the present invention, a system for screening telephone calls is provided. The system includes a ring detector that generates ring status data, such as a first data value when a ring signal is being received and a second data value when no ring signal has been received for a predetermined period of time. A message detector generates message status data, such as a first data value when an outgoing message end tone has been detected and a second data value when no outgoing message end tone has been detected for a predetermined period of time. A screener is connected to the ring detector and the message detector and amplifies an incoming message based on the ring status data and the message status data, such as when the ring status data and the message status data indicate that an incoming message is being recorded.

The present invention provides many important technical advantages. One important technical advantage of the present invention is a system and method for screening calls that do not require the message to be transmitted to the user. The present invention amplifies the line signal after a message is detected, so as to eliminate the need to retransmit the message to a screener.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
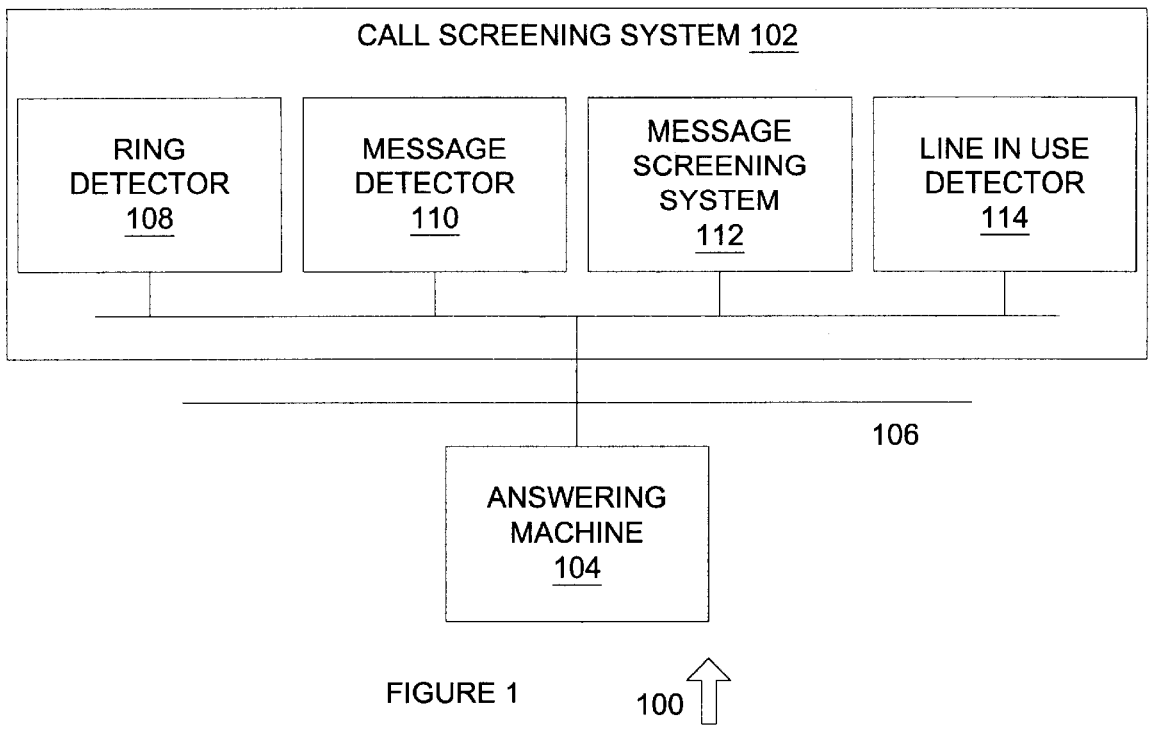
FIG. 1 is a diagram of a system for providing call screening with message detection in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for providing call screening with message detection in accordance with an exemplary embodiment of the present invention. System 100 allows a user at a remote telephone or location to screen an incoming call that is being received at an answering machine or other device without requiring the message to be retransmitted.

System 100 includes call screening system 102, which can be implemented in hardware, software, or a suitable combination of hardware and software, and which can be one or more hardware systems, one or more software systems operating on a processing platform such as a digital signal processor, or other suitable systems or devices. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of software in a specific purpose software application.

Call screening system 102 is coupled to answering machine 104 through telephone line 106. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system of a digital signal processor. Telephone line 106 can be conventional house telephone wiring or other suitable telephone signal conductors. In one exemplary embodiment, telephone line 106 can be a Voice Over Internet Protocol (VOIP) channel, a Voice Over Net (VON) channel, or other suitable packet switched voice data, and system 100 can be implemented in one or more software systems operating on processors distributed throughout a residence or other telephone service location. Answering machine 104 can be a conventional answering machine such as one that uses tape or digital storage media, one that generates an outgoing message that informs the caller that the called party has not answered and invites the caller to leave a message, or other suitable systems or devices.

Call screening system 102 includes ring detector 108, message detector 110, message screening system 112, and line in use detector 114, each of which can be implemented in hardware, software, or a suitable combination of hardware and software, which can be one or more hardware systems, one or more software programs operating on a suitable platform, or other suitable systems or devices. Ring detector 108 monitors a line signal on telephone line 106 and can detect when a ring tone is being generated. In one exemplary embodiment, ring detector 108 can detect the change in voltage that occurs when a ring tone is being transmitted over telephone line 106. Likewise, ring detector 108 can use other suitable processes to detect a ring signal. Ring detector 108 generates ring status data, such as a digital value of "1" when a ring is detected and a digital value of "0" when no ring is detected. Likewise, ring detector 108 can also include a time-out function, such that the ring status data is generated for a period of time corresponding to the maximum time permitted between ring tones.

Message detector 110 monitors signals on telephone line 106 and generates message status data. In one exemplary embodiment, message detector 110 monitors the signals on telephone line 106 to identify a predetermined outgoing message start signal or end signal, such as one matching one or more outgoing message signal types stored in a database, one matching a sampled outgoing message signal, or other suitable message indicator data. Message detector 110 generates message status data, such as a digital value of "1" when an outgoing message start tone or end tone is detected and a digital value of "0" when no outgoing message start tone or end tone is detected. Likewise, message detector 110 can also include a time-out function, such that the message status data is generated for a period of time corresponding to the maximum time permitted for a user to start talking to leave a message, the maximum message length, or other suitable periods of time.

Message screening system 112 receives ring status data, message status data, and other suitable data, and amplifies message data from telephone line 106 based on the ring detector status data, the message status data, and other suitable data. In one exemplary embodiment, message screening system 112 can detect ring status data, can then detect message status data, and can then amplify the message from telephone line 106. For example, the message can be amplified by using a line signal amplifier that is used by a telephone handset or other suitable line signal amplifier if the ring detector status data and message status data indicate that answering machine 104 has been activated in response to ringing on telephone line 106, and that a message indicator has been received, such as an outgoing message start tone or end tone generated by answering machine 104, an outgoing message, an incoming message, or other suitable message indicators. In this manner, message screening system 112 can use an intermediate impedance interface, a high impedance interface or other suitable line interfaces to allow the incoming message to be amplified for listening by a user without causing the answering machine to spuriously detect a line in use indication. Thus, reception and retransmission of the incoming message is not required by call screening system 121, although a reception and retransmission system can also be used where suitable. Likewise, message screening system 112 can perform call screening after the receipt of an outgoing message end status signal only, such as where ring status data is not required, or in other suitable configurations. Message screening system 112 can also allow a user to interrupt the incoming message such as by picking up a handset or activating a control, can time out after a predetermined amount of time, can allow the message to play until the end of the incoming message, or can perform other suitable functions.

Line in use detector 114 generates line in use data and off-hook status data. In one exemplary embodiment, line in use detector 114 can detect an off-hook state of answering machine 104 or a handset that is locally connected to telephone line 106, such as by determining that answering machine 104 has answered or that a telephone handset connected to the telephone line at the receiving end has been taken off hook. Detection of the off-hook state can be performed by a change in impedance, voltage, or other suitable functions.

Answering machine 104 can answer an incoming telephone call on telephone line 106 based on ring signals received over telephone line 106. In one exemplary embodiment, if a predetermined number of ring signals occur on telephone line 106 without an answer or termination of the ring signal, answering machine 104 can activate and answer the incoming call, taking telephone line 106 off-hook. Answering machine 104 can then generate an outgoing message that is transmitted to the caller informing the caller of the unavailability of the called party. At the end of such messages, answering machine 104 typically generates an outgoing message tone to signal the caller that it is now possible to leave a message. Such outgoing message tones typically fall within predetermined audible criteria, but may vary in a manner that makes it difficult to detect. Thus, message detector 110 can be configured to allow a user to select one of two or more predetermined outgoing messages tones, can continuously compare the two or more predetermined outgoing tones to the line signal, can sample the outgoing message end tone so as to make call screening system 102 compatible with any existing or future answering machines 104, or can perform other suitable functions to detect the existence of a message. Answering machine 104 can also generate a tone prior to generating the outgoing message, can generate other audible or non-audible data during the generation of the outgoing message, or can generate other suitable message indicators.

In operation, system 100 allows a user to screen messages without requiring retransmission of the message. In one exemplary embodiment, a user can screen calls from a remote location that is not near the answering machine, and can use a handset in that remote location to interrupt the message. Answering machine 104 can be configured to stop recording an incoming message once the user interrupts by picking up a handset, regardless of where within a residence or other service location the off-hook occurs. Thus, system 100 allows users to screen messages at an answering machine from remote locations without the need to adapt answering machine 104 to allow messages to be received by call screening system 102, and for use with conventional telephone handset systems.

Figure 2:
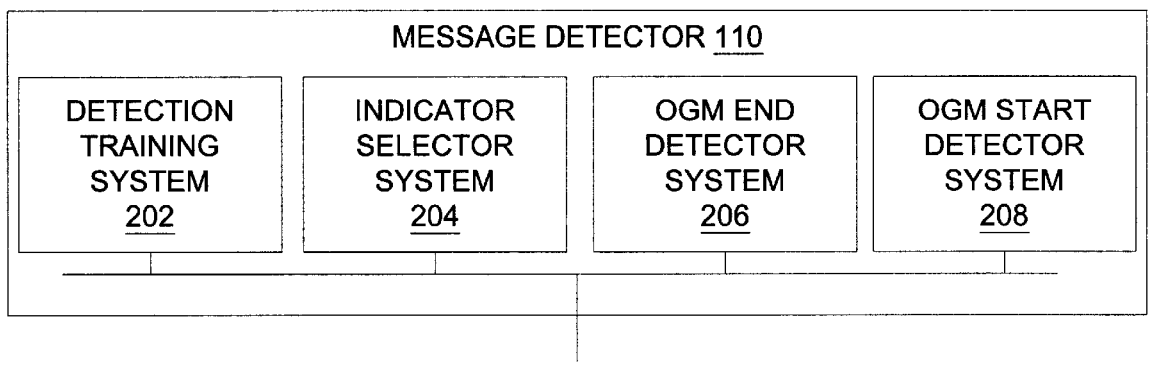
FIG. 2 is a diagram of a system for detecting a message end in accordance with an exemplary embodiment of the present invention.

FIG. 2 is a diagram of a system 200 for detecting a message in accordance with an exemplary embodiment of the present invention. System 200 includes message detector 110, detection training system 202, indicator selector system 204, OGM end detector 206, and OGM start detector 208, each of which can be implemented in hardware, software, or a suitable combination of hardware and software, and which can be one or more hardware systems, or one or more software systems operating on a suitable processor.

Detection training system 202 allows a user to sample a message tone or indicator for use in detecting a message. In one exemplary embodiment, detection training system 202 can allow a user to enter or initiate a training phase, such as by pushing a button after the initiation of an outgoing message by an answering machine 104. Detection training system 202 can then monitor the line signal and can detect when a tone or other suitable message indicator is generated, such as a tone having constant or repeating parameters. Detection training system 202 can then store the sampled message tone, can play back the message tone for verification by a user, such as by entry of verification data, can receive subsequent samples to allow detection training system 202 to confirm the message tone, or can perform other suitable functions.

Indicator selector system 204 allows a user to select from one of two or more message tones or other indicators. In one exemplary embodiment, indicator selector system 204 can include a table of data values corresponding to models of answering machines 104, with corresponding sampled tones, tone audio parameters, or other suitable data that can be used to detect a message tone or indicator generated for each available model of answering machine. Likewise, indicator selector system 204 can allow a user to select from two or more prerecorded message tones and select the message tone corresponding to the one generated by the user's answering machine 104. Other suitable functions can also be performed by indicator selector system 204.

OGM end detector 206 detects an outgoing message end tone, such as by using a stored list of outgoing message end tone parameters, a sampled outgoing message end tone, or other suitable data. Likewise, if no message tone is generated, detection training system 202 can use the outgoing message that has been sampled during training to determine when the outgoing message has ended in operation, or other suitable data.

OGM start detector 208 detects an outgoing message start tone, such as by using a stored list of outgoing message start tone parameters, a sampled outgoing message start tone, or other suitable data. Likewise, if no message tone is generated, detection training system 202 can use the outgoing message that has been sampled during training to determine when the outgoing message has started, or other suitable data.

In operation, system 200 allows a message tone to be detected, such as for use in a call screening system. System 200 allows users to screen calls by detecting the beginning or end of an outgoing message, the incoming message, or other suitable tones. In one exemplary embodiment, system 200 detects outgoing message end tones so that the user can screen the call without having to listen to the outgoing message. Since the outgoing message does not change, repeated listening to the outgoing message can be tedious and frustrating. Thus, system 200 improves the operation of call screening devices by allowing users to be relieved from constant and repetitive exposure to outgoing messages.

Figure 3:
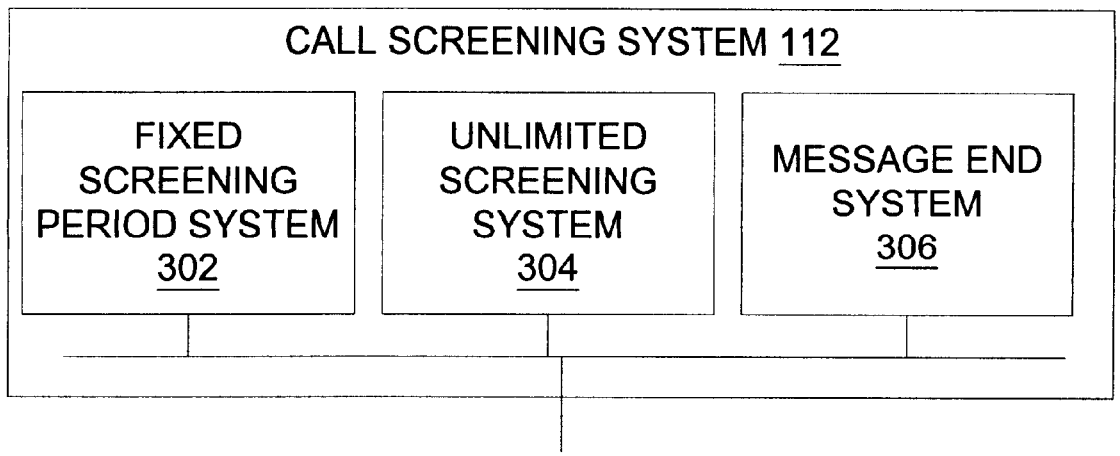
FIG. 3 is a diagram of a system for providing call screening in accordance with an exemplary embodiment of the present invention.

FIG. 3 is a diagram of a system 300 for providing call screening in accordance with an exemplary embodiment of the present invention. System 300 includes fixed screening period system 302, unlimited screening system 304, and message end system 306, each of which can be implemented in hardware, software, or a suitable combination of hardware and software, and which can be one or more hardware systems, or one or more software systems operating on a suitable processor.

Fixed screening period system 302 receives incoming message data and terminates the amplification of the incoming message data after a fixed period. In one exemplary embodiment, fixed screening period system 302 allows the user or equipment manufacturer to provide a predetermined message screening interval, such as 5 to 15 seconds or other suitable intervals, so that the user that is screening calls can determine whether or not they want to interrupt the incoming message and talk to the caller, but to limit amplification to a period that allows the user to make a decision but which is not an excessive or tediously long period. Likewise, fixed screening period system 302 can allow a user to select a period of time, such as by using a switch having intervals such as 5 seconds, 10 seconds, 30 seconds, or other suitable intervals. In this manner, users can select an incoming message screen period that suits the user.

Unlimited screening system 304 allows incoming messages to be screened until the end of the message occurs. In one exemplary embodiment, unlimited screening system 304 can detect when an incoming message has terminated, such as by a change in line impedance, voltage, or in other suitable manners. Unlimited screening system 304 thus allows a user to hear the entire incoming message. Unlimited screening system 304 can also include a switch or other user-selectable control that allows a user to terminate screening of the message, such as after the user has determined that the user does not want to either answer the call or continue listening to the message. Unlimited screening system 304 can be used in conjunction with fixed screening period system 302, such as by using a switch that allows a user to choose between a fixed screening period and an unlimited screening period, or in other suitable manners.

Message end system 306 detects the end of an incoming message and generates message end status data, such as to terminate call screening, to terminate incoming message recording, or for other suitable purposes. In one exemplary embodiment, message end system 306 determines a change in line impedance, voltage, or other suitable characteristics that can be used to detect the end of an incoming message. Likewise, message end system 306 can be used in conjunction with ring detector 108, message detector 110, or other suitable systems, such as by using status data from such systems in conjunction with changes in line voltage, impedance, or other suitable data or characteristics.

In operation, system 300 allows call screening to be performed by amplification through a high impedance interface to a line signal, such as after an outgoing message tone has been generated. System 300 can provide for fixed or variable screening periods, can terminate screening when the message ends, when a telephone has been taken off-hook, or can perform other suitable functions.

Figure 4:
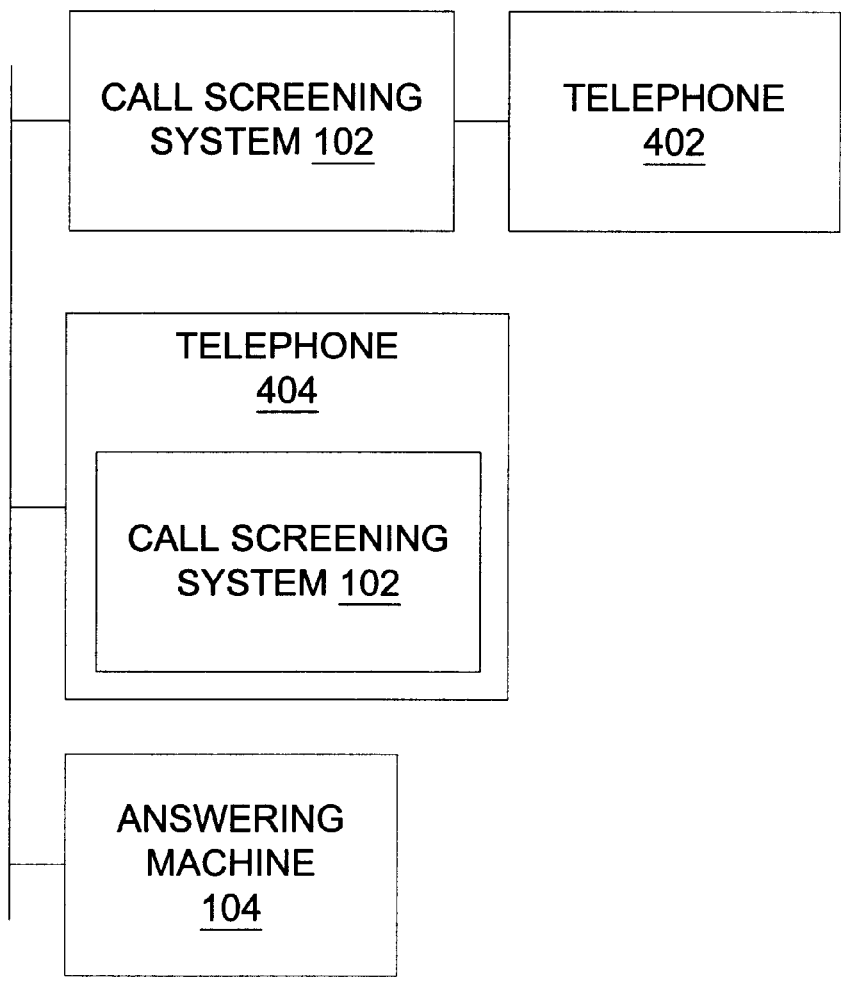
FIG. 4 is a diagram of a system for providing message screening in accordance with an exemplary embodiment of the present invention.

FIG. 4 is a diagram of a system 400 for providing outgoing message bypass call screening in accordance with an exemplary embodiment of the present invention. System 400 includes answering machine 104 and call screening system 102 in two different configurations. In the first configuration, call screening system 102 is coupled to telephone 402 in series with telephone line 106, such that call screening system 102 can detect whether an outgoing message has been generated and can connect telephone 402 to telephone line 106 to facilitate screening. In one exemplary embodiment, telephone 402 can include a loudspeaker, such that call screening system 102 utilizes the loudspeaker to play the incoming message. In another exemplary embodiment, telephone 402 can be a telephone handset, such as a corded or cordless telephone, and can receive an amplified line signal through a high impedance interface of call screening system 102. In yet another exemplary embodiment, call screening system 102 can have an internal speaker, so as to allow a user to screen calls locally, and can detect an off-hook condition of telephone 402 or other telephones to terminate incoming message screening when an off-hook condition occurs.

In another exemplary embodiment, call screening system 102 is contained within telephone 404. In this exemplary embodiment, telephone 404 can be configured to interface directly with call screening system 102 in a similar manner, such as by using a speaker, by allowing the user to hear the incoming message through a corded or a cordless telephone handset, or in other suitable manners.

In operation, system 400 allows call screening system 102 to be used as an add-on component or to be used independently, such as where telephone 402 does not have a loudspeaker and a screening loudspeaker is included within call screening system 102, or in other suitable manners. System 400 thus allows call screening system 102 to be used as a stand-alone device, in conjunction with a telephone handset, as a built-in feature for a telephone handset, or in other suitable manners.

Figure 5:
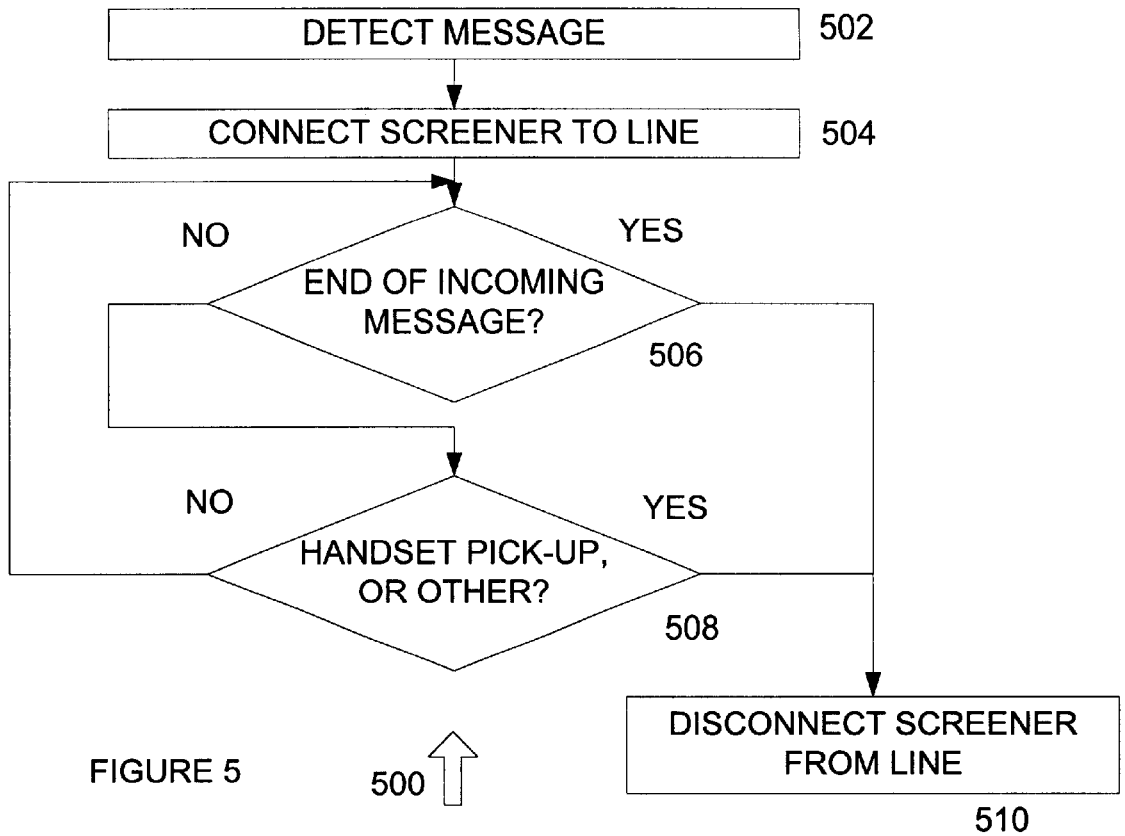
FIG. 5 is a flowchart of a method for providing call screening in accordance with an exemplary embodiment of the present invention.

FIG. 5 is a flowchart of a method 500 for providing call screening in accordance with an exemplary embodiment of the present invention. Method 500 begins at 502 where a message is detected. In one exemplary embodiment, the message can be detected by detecting the occurrence of a tone on a telephone line that signals a caller to leave an incoming message, by using a sample of the outgoing message, by a tone that indicates the beginning or other suitable points of a message, or in other suitable manners. The method then proceeds to 504.

At 504, a screener is connected to the telephone line. In one exemplary embodiment, the screener can be connected to the telephone line through a high impedance device using an amplifier on the other side of the high impedance device or in other suitable manners. Likewise, the screener can be connected inductively, capacitively, or in other suitable manners. The method then proceeds to 506.

At 506, it is determined whether the end of an incoming message has been reached. If the end of the incoming message has not been reached, the method proceeds to 508. Otherwise, if the end of the incoming message has been reached, the method proceeds to 510, where the screener is disconnected from the line.

If it is determined at 508 that a handset pickup or other suitable event has occurred, such as actuation by a user of an end screening control, the method also proceeds to 510. Otherwise, the method returns to 506.

In operation, method 500 allows an incoming message to be screened by using the detection of the end of the outgoing message as an indicator of when to start screening the call. Method 500 allows the screening to be interrupted when the end of the incoming message has occurred or when the handset has been picked up.

Figure 6:
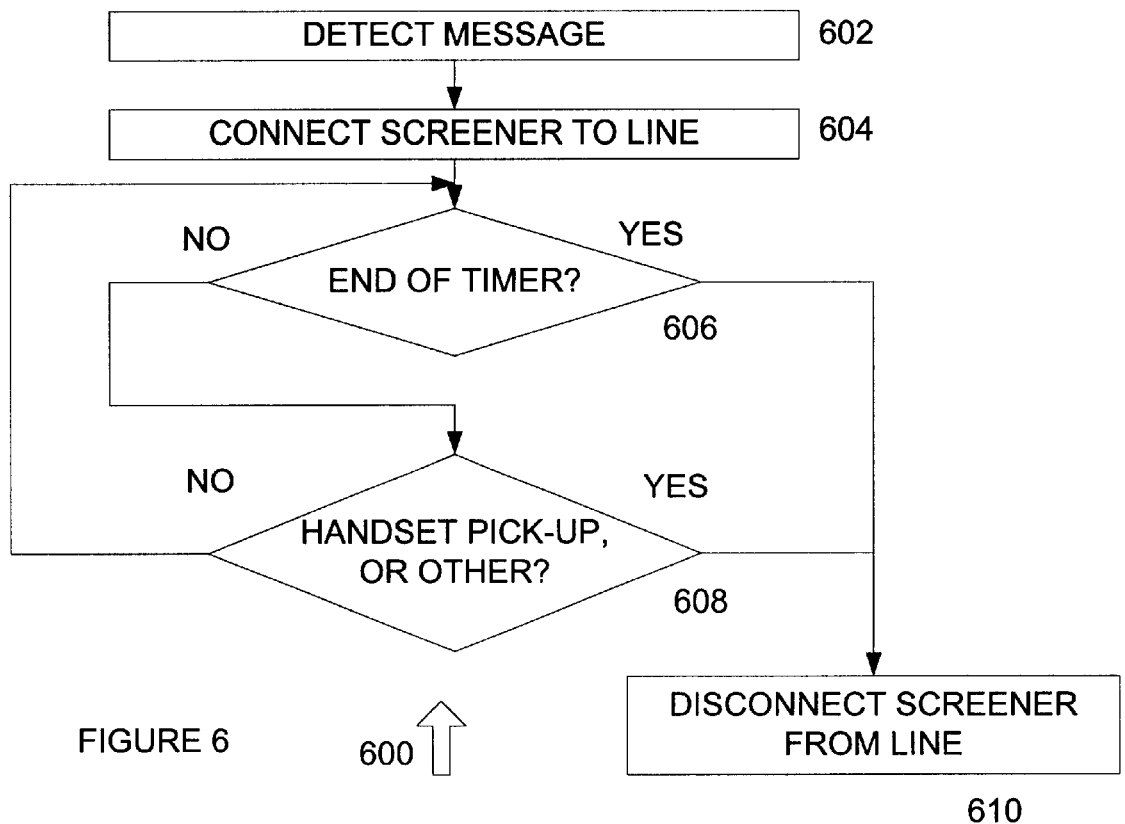
FIG. 6 is a flowchart of a method for providing call screening for a predetermined period in accordance with an exemplary embodiment of the present invention.

FIG. 6 is a flowchart of a method 600 for providing call screening for a predetermined period in accordance with an exemplary embodiment of the present invention. Method 600 begins at 602 where a message is detected. In one exemplary embodiment, the end of the outgoing message can be detected by detecting the occurrence of a tone on a telephone line that signals a caller to leave an incoming message, by using a sample of the outgoing message, by detecting a tone that occurs at the beginning or other suitable points of a message, or in other suitable manners. The method then proceeds to 604.

At 604, a screener is connected to the telephone line. In one exemplary embodiment, the screener can be connected to the telephone line through a high impedance device using an amplifier on the other side of the high impedance device or in other suitable manners. Likewise, the screener can be connected inductively, capacitively, or in other suitable manners. The method then proceeds to 606.

At 606, it is determined whether the end of a timer has occurred, or other suitable manners for determining whether a predetermined period of time has been reached can be implemented. If the end of the time period has not been reached, the method proceeds to 608. Otherwise, if the end of the time period has been reached, the method proceeds to 610, where the screener is disconnected from the line.

If it is determined at 608 that a handset pickup or other suitable event has occurred, such as actuation by a user of an end screening control, the method also proceeds to 610. Otherwise, the method returns to 606.

In operation, method 600 allows an incoming message to be screened by using the detection of the end of the outgoing message as an indicator of when to start screening the call. Method 600 allows the screening to be interrupted when the end of a predetermined time period has occurred or when the handset has been picked up.

Figure 7:
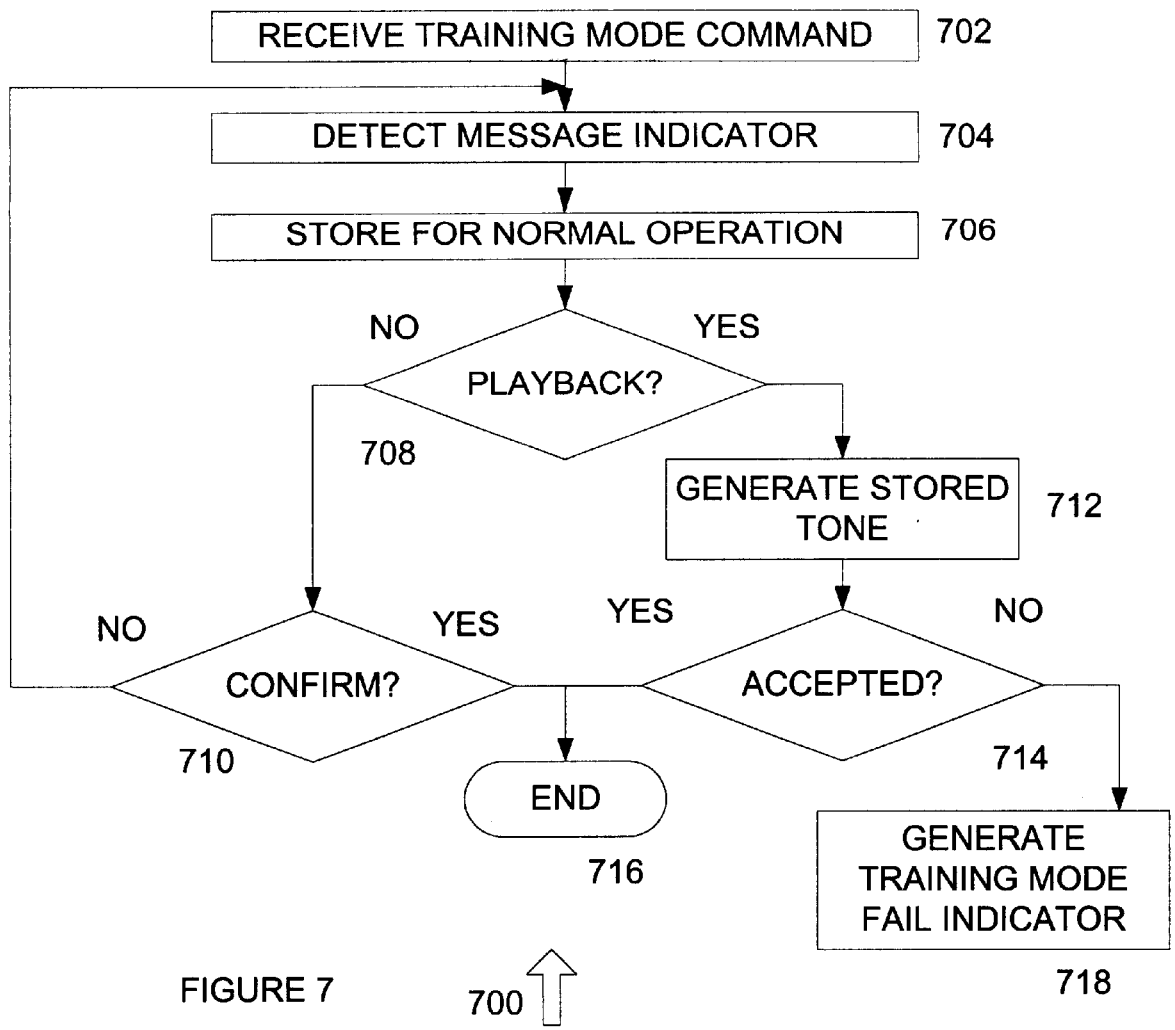
FIG. 7 is a diagram of a method for training a message screening system in accordance with an exemplary embodiment of the present invention.

FIG. 7 is a diagram of a method 700 for training an outgoing message bypass call screening system in accordance with an exemplary embodiment of the present invention. Method 700 begins at 702 where a training mode command is received. In one exemplary embodiment, a user can change a mechanical or digital selector switch to a position for a training mode, can push a training mode button, or can perform other suitable functions that cause a training mode to be entered. The method then proceeds to 704.

At 704, a message indicator is detected. In one exemplary embodiment, the message indicator can be the outgoing message end tone, where the outgoing message can be distinguished from the outgoing message end tone using predetermined criteria, such as tone constancy, tone repetitiveness, signal variability to distinguish an end tone from a voice tone, or other suitable functions. Other message indicators can likewise be used, such as outgoing message start tones, ring tones, answering machine actuation signals, or other suitable message indicators. The method then proceeds to 706.

At 706, the message indicator detected at 704 is stored for normal operation. In one exemplary embodiment, the storage can occur by storing the characteristics of the message indicator in a memory, by matching the message indicator to a pre-stored memory location corresponding to the message indicator, or in other suitable manners. The method then proceeds to 708.

At 708, it is determined whether playback is to occur. For example, playback can be used to allow a user to verify the message indicator. If it is determined at 708 that playback is not required, the method proceeds to 710.

At 710, it is determined whether the message indicator has been confirmed. If the user has not confirmed the message indicator, the method returns to 704. Otherwise, the method proceeds to 716 and terminates. Step 710 can also be omitted. If it is determined at 708 that playback is required, the method proceeds to 712 where a stored message indicator is generated. In one exemplary embodiment, the stored message indicator can be generated to allow a user to accept or reject the stored message indicator. The method then proceeds to 714.

At 714, it is determined whether the user has accepted the stored message indicator. If the user accepts the stored message indicator, the method proceeds to 716 and ends. Otherwise, the method proceeds to 718 and a training mode fail indicator is generated.

In operation, method 700 allows a user to train an outgoing message bypass call screening device to detect a message by detecting a message indicator, such as an outgoing message start tone, end tone or by other suitable indicators. Method 700 can also allow the detected message indicator to be verified by repeating the detection process, by allowing the user to listen to the message indicator for confirmation, or in other suitable manners.

Figure 8:
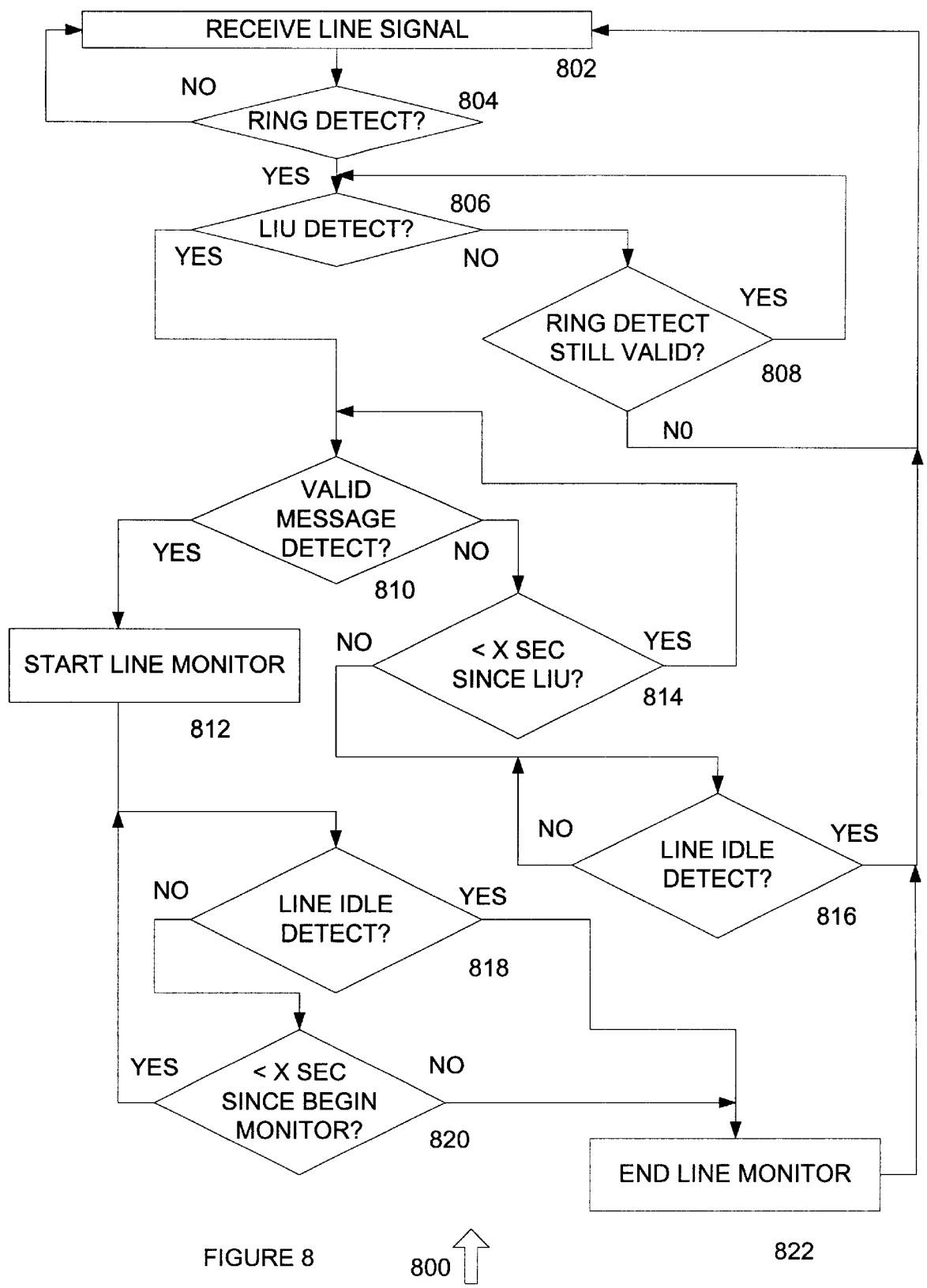
FIG. 8 is a flowchart of a method for processing a line signal to perform call screening in accordance with an exemplary embodiment of the present invention.

FIG. 8 is a flowchart of a method 800 for processing a line signal to perform message screening in accordance with an exemplary embodiment of the present invention. Method 800 begins at 802, where a line signal is received. In one exemplary embodiment, the line signal can be a telephone line signal. The method then proceeds to 804.

At 804, it is determined whether a ring signal has been detected. If a ring signal has not been detected, the method returns to 802. Otherwise, the method proceeds to 806.

At 806, it is determined whether a line in use condition has been detected. If a line in use condition has not been detected, the method proceeds to 808 where it is determined whether the ring detector is still valid, such as whether a timeout has occurred where the period of time that has elapsed is greater than a maximum period of time between rings. If the ring detector is still valid, the method returns to 806. Otherwise, the method returns to 802.

If it is determined that a line in use condition has been detected at 806, the method proceeds to 810 where it is determined whether a valid message has been detected. If a valid message has not been detected, the method proceeds to 814 where it is determined whether a time period of less than or equal to X seconds has occurred since the line in use signal was detected. If the period of less than or equal to X seconds has not occurred, the method proceeds to 816 where it is determined whether a line idle detect condition has occurred. If a line idle detect condition has not occurred, the method returns to 816. Otherwise, the method returns to 802. Likewise, if it is determined at 814 that less than or equal to X seconds has occurred since the line in use signal was detected, the method returns to 810.

If it is determined at 810 that a valid message has been detected, the method proceeds to 812 where a line monitor or other suitable systems or procedures are used to monitor the incoming message. In one exemplary embodiment, the line can be monitored through an impedance that is greater than the amount of impedance that will cause a line in use detector to actuate, so as to avoid creating the appearance that a handset has picked up. The method then proceeds to 818 where it is determined whether a line idle condition has been detected. If a line idle condition has been detected, the method proceeds to 822 and the line monitoring is ended. Otherwise, the method proceeds to 820 where it is determined whether less than or equal to X seconds has elapsed since the monitoring was initiated. In one exemplary embodiment, this procedure can be bypassed or not provided, such as when a fixed period of time for providing the screening function is not provided. If it is determined at 820 that less than or equal to X seconds has occurred since the beginning of monitoring, then the method proceeds to 822 and ends. Otherwise, the method returns to 818.

In operation, method 800 allows messages to be screened using the detection of a message indicator to initiate screening, such as by detecting an outgoing message tone, other message tones, or other suitable signals. In one exemplary embodiment, a user can screen incoming calls using existing telephones and answering machines without modification of such existing telephones and answering machines. In another exemplary embodiment, method 800 can be used in conjunction with a telephone handset or device that is to be used in a location that is remote from the answering machine or other device, and does not require the answering machine or other device to be modified in any manner so as to support the operation of the remote handset or device.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system for screening telephone calls comprising:
   an outgoing message end tone selector system receiving tone selection data from a table of data values and selecting a predetermined tone for use in generating message status data; and
   a message screener coupled to the outgoing message end tone selector system, the message screener amplifying an incoming message based on the message status data.

2. The system of claim 1 wherein the outgoing message end tone selector system comprises a detection training system receiving training start data and storing an outgoing message end tone in response to the training start data.

3. The system of claim 1 wherein the outgoing message end tone selector system comprises a table of outgoing message end tones.

4. The system of claim 1 wherein the message screener comprises a fixed screening period system terminating the amplification of the incoming message after an adjustable period of time.

5. The system of claim 1 wherein the message screener comprises an unlimited screening system terminating the amplification of the incoming message after the incoming message has terminated.

6. The system of claim 1 wherein the message screener comprises a message end system rating the amplification of the incoming message after off-hook status data is received.

7. The system of claim 6 wherein the message screener comprises a line in user-detector generating the off-hook status data.

8. A method for screening telephone calls comprising:
   selecting an outgoing message end tone from a table of data values based on answering machine data; and
   providing a telephone line signal to a screener after the outgoing message end tone has been generated.

9. The method of claim 8 wherein selecting an outgoing message end tone based on answering machine data comprises sampling the outgoing message tone generated by the answering machine.

10. The method of claim 8 wherein providing the telephone line signal to the screener after the outgoing message has been generated comprises providing the telephone line signal for a predetermined period of time.

11. The method of claim 8 wherein selecting the outgoing message end tone based on the answering machine data comprises selecting the outgoing message end tone from a table of outgoing message end tones.

12. The method of claim 8 wherein selecting the outgoing message end tone based on answering machine data further comprises receiving user-entered model number data for the answering machine.

13. The method of claim 8 wherein providing the telephone line signal to the screener after the outgoing message end tone has been generated comprises providing the telephone line signal until an end of an incoming message.

14. The method of claim 8 wherein providing the telephone line signal to the screener after the outgoing message end tone has been generated comprises providing the telephone line signal until an off-hook signal is detected.

15. The method of claim 8 wherein providing the telephone line signal to the screener after the outgoing message end tone has been generated comprises amplifying the telephone line signal through an impedance that is greater than 600 ohms.

16. The method of claim 8 wherein providing the telephone line signal to the screener after the outgoing message end tone has been generated comprises providing an incoming message to a telephone handset that is remote from a telephone answering machine for a predetermined period of time to allow a user at the telephone handset to determine whether to interrupt the incoming message and answer the call.

* * * * *